A. MacBETH.
INSULATED HANDLE FOR HOT WATER VESSELS.
APPLICATION FILED JAN. 22, 1910.
967,799.
Patented Aug. 16, 1910.
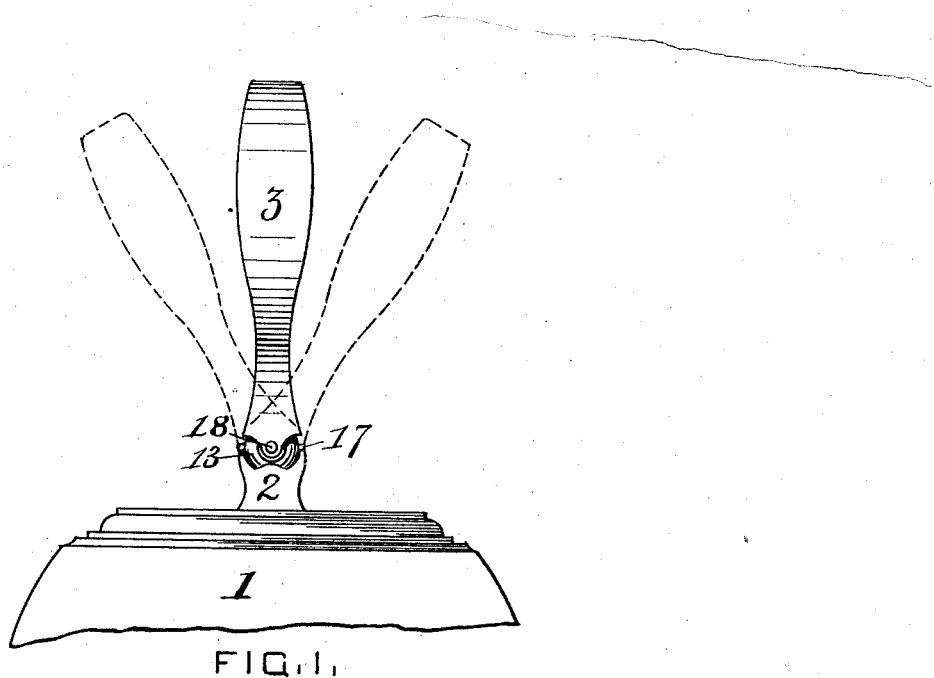
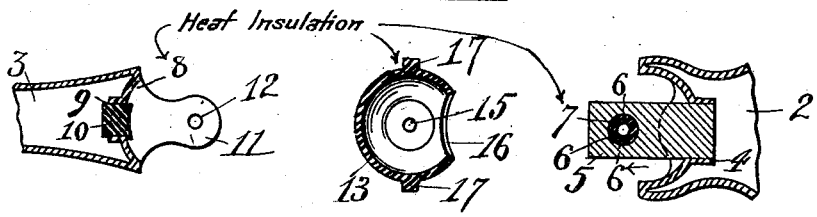
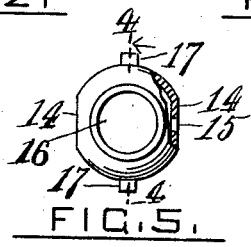
WITNESSES:
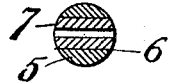
INVENTOR:

Figure 1 is a side elevation of a fragment of a tea, coffee or other hot water vessel, showing the handle applied in position. Fig. 2 is a central longitudinal cross section of one of the members of the handle. Fig. 3 is a view similar to Fig. 2, being another member of the handle. Fig. 4 is a section taken on a line 4—4 of Fig. 5. Fig. 5 is an elevation of one of the members of the handle, the same being partly broken away and in section, and Fig. 6 is a sectional view taken on the line 6—6 of Fig. 3.

UNITED STATES PATENT OFFICE.

ALEXANDER MACBETH, OF PROVIDENCE, RHODE ISLAND, ASSIGNOR TO GORHAM MANUFACTURING COMPANY, OF PROVIDENCE, RHODE ISLAND, A CORPORATION OF RHODE ISLAND.

INSULATED HANDLE FOR HOT-WATER VESSELS.

967,799. Specification of Letters Patent. Patented Aug. 16, 1910.

Application filed January 22, 1910. Serial No. 539,595.

*To all whom it may concern:*

Be it known that I, ALEXANDER MACBETH, a citizen of the United States, residing at Providence, in the county of Providence and State of Rhode Island, have invented a new and useful Improvement in Insulated Handles for Hot-Water Vessels, of which the following is a specification.

This invention relates to certain new and useful improvements in insulated handles for hot water vessels, and has for its object a handle of this type which will be completely insulated so as to be incapable of being heated by the contents of the vessel.

Further objects of the invention are to provide an insulated handle which is simply and economically constructed, of great efficiency in use, and presenting an ornamental and attractive appearance.

Further and other objects will be hereinafter set forth.

In the drawings, Figure 1 is a side elevation of a fragment of a tea, coffee or other hot water vessel, showing the handle applied in position. Fig. 2 is a central longitudinal cross section of one of the members of the handle. Fig. 3 is a view similar to Fig. 2, being another member of the handle. Fig. 4 is a section taken on a line 4—4 of Fig. 5. Fig. 5 is an elevation of one of the members of the handle, the same being partly broken away and in section, and Fig. 6 is a sectional view taken on the line 6—6 of Fig. 3.

The tea, coffee or other hot water vessel is designated by the numeral 1 in the drawings and has secured thereto the outwardly-extending arms 2 which latter are depicted in the drawings as being of hollow construction.

The handle proper is designated by the reference numeral 3 and same is connected to the outer ends of the arm 2, the present invention residing particularly in the means for connecting the ends of handle 3 with the outer ends of the arms 2, and as each of the connecting means is similar in all material respects, but one of same will be particularly described.

The arm 2 is formed with a seat 4 preferably by turning the outer end portion of the arm 2 inwardly in a manner illustrated in Fig. 3, and in this seat a cylinder-like metal member 5 is secured by soldering or any other approved means, member 5 projecting beyond the outer end of arm 2 and being formed with a transverse perforation 6. The perforation or opening 6 has its walls lined with suitable insulating material such as ivory, bone, wood or fibroid, the lining in the present instance consisting of a bushing 7 formed of the insulating material and secured in the opening 6 in any suitable manner.

The ends of the handle are pressed inwardly as at 8 and are formed with seats 9 in which are held blocks of insulating material 10. The outer end of the block 10 is preferably given a concave contour as shown. Each end of the handle is further formed with a pair of opposite outwardly extending ears 11 which are perforated as at 12.

The connecting member proper consists of a ball-like element 13 formed of insulating material and provided with opposite flattened portions 14 and with diametrically opposed openings 15, one side of the ball being cut away as at 16 to receive member 5. The ball may be hollow as shown in Fig. 3, or solid if preferred, and is formed on its periphery with outwardly projecting teats 17, the function of which will now be set forth.

In assembling the parts member 5 is received in the interior of the ball 13 being passed through the cut-out part 16, the openings 15 in the ball 13 being brought to aline with the opening in the bushing 7, after which the ball 13 is placed between the ears 11 of handle 3 so that the registering openings 15 and that of the bushing will register with the perforations 12 in ears 11, whereupon a retaining pin 18 is passed through all of the registering openings just noted to secure the parts in their respective position.

By inspection of Fig. 1 it will be observed that the teats 17 engage between the adjacent end portions of arm 2 and handle 3 and thereby prevent contact between such portions, assuring of perfect insulation at these points.

It will be observed that by the above construction and relationship of parts that complete and perfect insulation is obtained. Moreover the device is simple and economical in construction and can be readily and quickly assembled. None of the metallic parts are in actual contact with each other, and consequently traveling of the heat from one part to another is positively prevented. The insulating block 10 acts to contact with the ball and thus further assures of a more thorough and complete insulation.

Having thus described my invention, I claim as new and desire to secure by Letters Patent;—

1. In combination with a vessel, an insulated handle therefor consisting of a handle proper, perforated ears carried by the handle, an insulating block carried by the handle and located to the rear of said ears, an arm secured to the vessel, and having an outwardly projecting member carried thereby, said member being perforated and having the walls of the perforation lined with insulating material, a hollow ball having a cut-away part to receive said projecting member of the arm, said ball being perforated and adapted to have the perforation register with said opening of the projecting member of the arm, a teat on said ball projecting outwardly and adapted to engage between adjacent end portions of the arm and handle, and a retaining pin passed through the registering openings of the projecting member of the arm, of the ball, and of the ears of the handle.

2. In combination with a vessel, an insulating handle therefor consisting of a handle proper, an arm on the vessel formed with an outwardly projecting member, a hollow insulating ball receiving said projecting member of the arm, means on the handle to embrace said ball, means for securing the handle, ball and projecting member of the arm together, and means carried by the ball to engage between the adjacent end portions of the handle and arm, to prevent contact between same.

3. In combination with a vessel, an insulated handle therefor consisting of a handle proper formed with perforated ears, a block of insulating material carried by the handle proper and being arranged to the rear of the outer ends of said ears, an arm on the vessel formed with an outwardly extending substantially cylindrical member, a hollow ball formed with an opening to receive said cylindrical member to allow the latter to project on the interior of the ball, and a securing pin extending through said perforations of the ear and through openings provided therefor in said cylindrical member and said hollow ball.

4. In combination with a vessel, an insulated handle therefor consisting of a handle proper having an insulating block, an arm on the vessel formed with an outwardly extending cylindrical member, a hollow ball formed with an opening to receive such cylindrical member and having its portion diametrically opposite to said opening disposed in proximity to said block of insulating material, and means passed through the handle proper, the hollow ball and said cylindrical member to unite said parts.

5. In combination with a vessel, an insulated handle therefor consisting of a handle proper, an arm on the vessel formed with an outwardly extending cylindrical member, said member being formed with a transverse opening, a bushing of insulating material lining said opening, a hollow ball of insulating material formed with an opening to receive said member, the latter extending loosely on the interior of the ball, and a retaining pin extending through the handle proper, said bushing of insulating material, and through the ball to connect said parts.

In testimony whereof I have signed my name to this specification in the presence of two subscribing witnesses.

ALEXANDER MacBETH.

Witnesses:
 ADA E. HAGERTY,
 J. A. MILLER.